United States Patent
Wong et al.

(10) Patent No.: US 10,092,047 B2
(45) Date of Patent: Oct. 9, 2018

(54) INTEGRATED ELASTOMERIC ARTICLE MANUFACTURING SYSTEM AND PROCESS

(71) Applicant: ALLEGIANCE CORPORATION, Chicago, IL (US)

(72) Inventors: Wei Cheong Wong, Kulim (MY); Jason Lim, Bayan Lepas (MY); Tse-Liang Yeoh, Georgetown (MY)

(73) Assignee: ALLEGIANCE CORPORATION, McGaw Park, IL (US)

( * ) Notice: Subject to any disclaimer, the term of this patent is extended or adjusted under 35 U.S.C. 154(b) by 0 days.

(21) Appl. No.: 14/941,539

(22) Filed: Nov. 14, 2015

(65) Prior Publication Data
US 2016/0374416 A1 Dec. 29, 2016

Related U.S. Application Data

(60) Provisional application No. 62/079,433, filed on Nov. 13, 2014.

(51) Int. Cl.
*A41D 19/00* (2006.01)
*A41D 19/04* (2006.01)
(Continued)

(52) U.S. Cl.
CPC ....... *A41D 19/043* (2013.01); *A41D 19/0055* (2013.01); *B29C 37/0017* (2013.01);
(Continued)

(58) Field of Classification Search
CPC .............. A41D 19/0055; A41D 19/043; B29C 37/0017
See application file for complete search history.

(56) References Cited

U.S. PATENT DOCUMENTS

| | | | | |
|---|---|---|---|---|
| 1,771,521 A | * | 7/1930 | Baum | A41D 19/043 223/41 |
| 2,218,056 A | * | 10/1940 | Snyder | A41D 19/043 223/40 |

(Continued)

FOREIGN PATENT DOCUMENTS

| | | |
|---|---|---|
| CN | 2233826 Y | 8/1996 |
| CN | 101314248 A | 12/2008 |

(Continued)

OTHER PUBLICATIONS

International Preliminary Report on Patentability and Written Opinion for PCT/US2015/060760 dated May 16, 2017, 5 pages.
(Continued)

*Primary Examiner* — Shaun R Hurley
*Assistant Examiner* — Andrew W Sutton
(74) *Attorney, Agent, or Firm* — Nicole M. Creegan

(57) ABSTRACT

Described are systems, devices, and methods for stripping a formed thin film elastomeric article such as a latex or synthetic polymer medical or surgical glove from a mold, inverting the article, and transferring and securing the inverted article to a mandrel for further on-line processing, integrating dip forming and off-line surface treatment processes into a single, continuous on-line process. The system can include a stripping apparatus including an actuation device for peeling the article from the mold and inverting the article, and a donning device to receive the inverted article. The system may position the article about a mandrel of the donning device. The mandrel may expand or separate to engage the interior of the inverted article to securely hold the article on the mandrel. The donning device may be coupled to a continuous loop conveyor chain to carry the donning device and the mounted article through on-line secondary processing.

22 Claims, 13 Drawing Sheets

(51) Int. Cl.
    *B29C 37/00*     (2006.01)
    *B29C 41/14*     (2006.01)
    *B29C 41/42*     (2006.01)
    *B29L 31/48*     (2006.01)
    *B29K 21/00*     (2006.01)

(52) U.S. Cl.
    CPC .............. *B29C 41/14* (2013.01); *B29C 41/42* (2013.01); *B29K 2021/00* (2013.01); *B29L 2031/4864* (2013.01)

(56) References Cited

U.S. PATENT DOCUMENTS

| | | | | |
|---|---|---|---|---|
| 2,286,059 A * | 6/1942 | Brownstein | .......... | A41D 19/043 223/57 |
| 2,510,341 A * | 6/1950 | Keller | .................. | A41D 19/043 223/40 |
| 2,838,216 A * | 6/1958 | Beasley | ................. | A41D 19/04 101/35 |
| 3,010,623 A * | 11/1961 | Parrish | .................. | A41D 19/04 223/57 |
| 3,010,624 A * | 11/1961 | Parrish | .................. | A41D 19/04 223/78 |
| 3,124,066 A * | 3/1964 | Crane | .................... | A41D 19/04 101/44 |
| 3,143,258 A * | 8/1964 | Wittler | ................ | A41D 19/043 223/43 |
| 3,570,053 A * | 3/1971 | Rodrigues et al. | .......................... | B29C 37/0017 425/168 |
| 3,655,317 A | 4/1972 | Funkhouser et al. | | |
| 3,656,669 A * | 4/1972 | Conklin | ............... | A41D 19/043 223/40 |
| 3,738,547 A * | 6/1973 | Horton | ................. | A41D 19/043 223/40 |
| 3,820,383 A | 6/1974 | Van Deventer et al. | | |
| 4,023,720 A * | 5/1977 | Filko | ........................ | D06G 3/02 223/40 |
| 4,036,415 A * | 7/1977 | Filko | ........................ | D06G 3/02 223/40 |
| 4,436,231 A * | 3/1984 | Kelly | ................... | A41D 19/043 223/40 |
| 5,776,520 A * | 7/1998 | Howe | ..................... | B29C 33/36 425/274 |
| 6,306,514 B1 | 10/2001 | Weikel et al. | | |
| 6,391,409 B1 | 5/2002 | Yeh et al. | | |
| 7,726,526 B2 | 6/2010 | Cattenhead | | |
| 2004/0107477 A1* | 6/2004 | Janssen | ................ | C08K 5/0025 2/161.7 |
| 2006/0115653 A1* | 6/2006 | Soerens | .................. | A61B 42/60 428/423.1 |
| 2008/0311409 A1 | 12/2008 | Lipinski | | |

FOREIGN PATENT DOCUMENTS

| | | | |
|---|---|---|---|
| CN | 201261238 Y | 6/2009 | |
| CN | 201325060 Y | 10/2009 | |
| CN | 100584566 C | 1/2010 | |
| CN | 201659700 U | 12/2010 | |
| CN | 102267205 A | 12/2011 | |
| CN | 102407584 A | 4/2012 | |
| CN | 202186000 U | 4/2012 | |
| CN | 102514136 A | 6/2012 | |
| CN | 202378228 U | 8/2012 | |
| CN | 202412536 U | 9/2012 | |
| CN | 202826174 U | 3/2013 | |
| CN | 103057025 A | 4/2013 | |
| CN | 203092878 U | 7/2013 | |
| CN | 103231471 A | 8/2013 | |
| CN | 203168101 U | 9/2013 | |
| CN | 103350472 A | 10/2013 | |
| CN | 203371695 U | 1/2014 | |
| CN | 203726697 U | 7/2014 | |
| CN | 203994401 U | 12/2014 | |
| DE | 4439136 A1 * | 4/1996 | ......... B29C 37/0017 |
| GB | 2232919 A | 1/1991 | |
| WO | 2014122595 A1 | 8/2014 | |

OTHER PUBLICATIONS

International Search Report and Written Opinion for Application No. PCT/US2015/060760, dated Feb. 16, 2016, 8 pages.

* cited by examiner

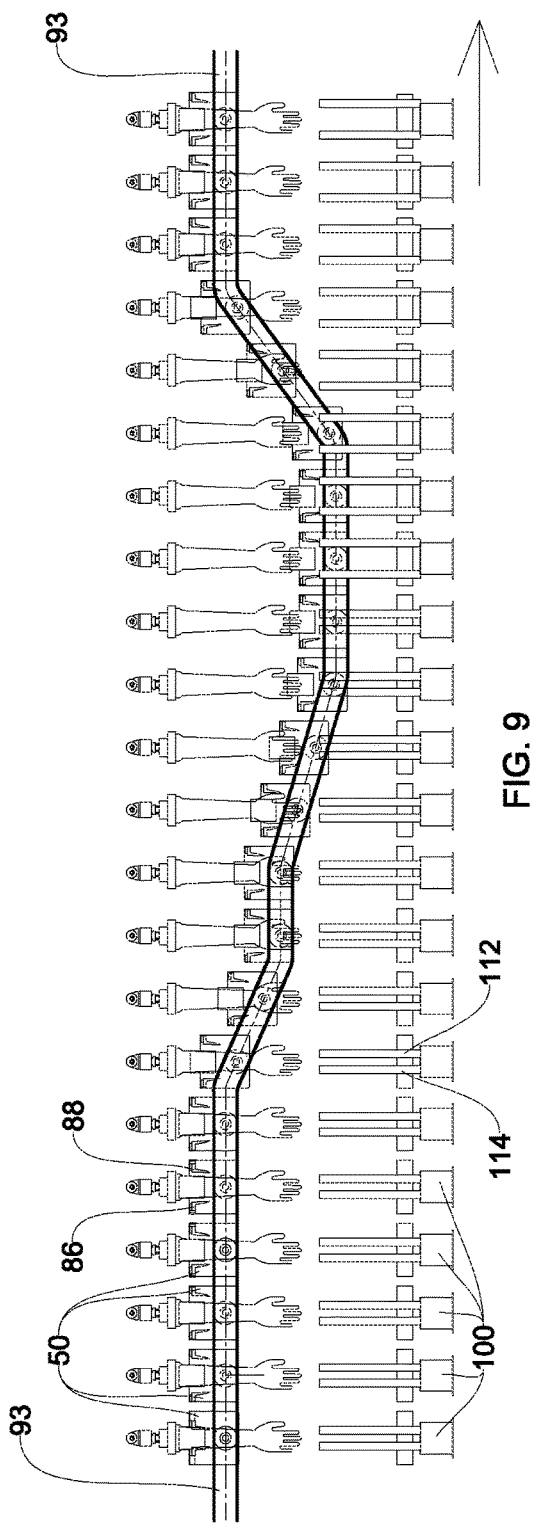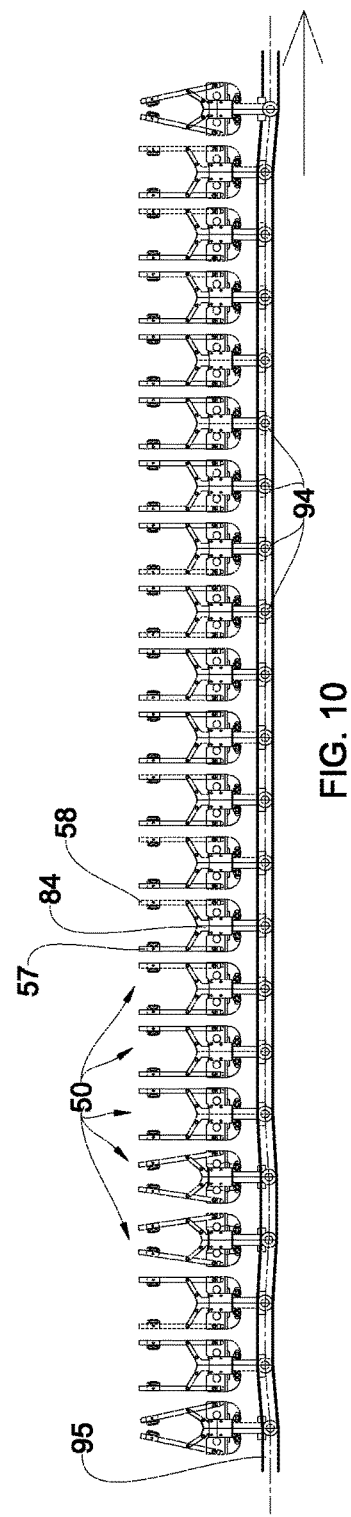

INTEGRATED ELASTOMERIC ARTICLE MANUFACTURING SYSTEM AND PROCESS

BACKGROUND

At present, the manufacture of certain elastomeric and polymer latex articles (such as surgical or examination gloves used in hospitals and other medical facilities, work gloves, prophylactics, catheters, balloons, etc.) typically involves two major processes, namely the on-line glove dipping or forming platform process (also known as the primary manufacturing process) and off-line processing (also known as the secondary manufacturing process).

In the dipping or forming platform process, for example, surgical gloves may be formed by one of two methods. One such method is a batch dip process, in which one or more molds (also referred to as formers) are dipped into one or more tanks containing liquid molding material (such as natural latex or synthetic polymers such as polyisoprene, nitrile rubber, vinyl, polyvinylchloride, polychloroprene, or polyurethane) or various other chemicals (such as coagulant). The second method is a continuous dip method, which is the most common, economical, and efficient method for high-volume glove manufacturing.

In a typical continuous dip process, such as that used in the manufacture of surgical gloves, a continuous loop conveyor chain carries the glove molds through the necessary cleaning, dipping, curing, and stripping processes. After a formed glove is stripped from a mold, the conveyor chain carries the mold back to the beginning of the cleaning process to begin a new cycle. Thus, the molds are utilized in a continuous cyclic manner. To increase efficiency, the conveyor chain moves continuously and at a constant speed throughout the continuous dipping process. Specialized equipment is required to conduct the various processes on the gloves as they are constantly traveling through the manufacturing facility. The initial stage of the dipping platform process typically includes the cleaning of the molds, as a clean mold surface is important for forming a quality glove. These clean molds are then carried by the conveyor chain through the coagulant dip process. As the molds continue to traverse laterally along with the conveyor chain, the molds are lowered into, and subsequently raised out of, a coagulant solution contained in an elongated dip tank. After the coagulant dip, the conveyor chain carries the coagulant-coated molds through a second tank containing the liquid molding material, such as latex. The coagulant coatings typically include salts that neutralize the surfactants in the liquid molding material emulsions, and which locally destabilize the liquid molding material, thus causing it to gel (or coalesce) and adhere as a film on the surface of the mold. The molds may be dipped in liquid molding material one or more times to achieve the desired glove thickness. The glove may then be dipped into a leaching tank containing circulating hot water to remove the water-soluble components, such as salts used in the coagulant solution or certain proteins present in the natural latex.

After the glove is formed, it undergoes a drying process in a drying oven to dry the thin gel layer prior to a high-temperature curing process to set and vulcanize the thin gelatinized film onto the mold surface. One or more additional layers, coatings or treatments may be formed or applied to the external surface of the formed glove, either before, after, or between drying and curing. For example, the external layer of the thin film, which typically becomes the user side (also known as the interior or donning side), may be coated with a donning composition or otherwise treated to make donning of the glove easier.

Typically, the final stage of the continuous dipping platform process is the stripping (i.e., removal) of the glove from its mold prior to the mold looping back to the mold cleaning process. Conventionally, the glove removal process is performed by a human operator manually stripping the gloves (with or without the aid of machines) or, in certain cases, using an automated stripping machine to strip the gloves from the molds. This process can result in significant waste if the gloves are not stripped properly. Molded gloves tend to adhere to the surface of the mold, such that the gloves must be gently peeled off of the mold. If they are pulled from the mold too quickly, with too much force, or if they are gripped such that too much stress is concentrated at the gripped points, the gloves can be punctured, torn, or otherwise compromised. Typically, because the cuff edge of the glove is peeled from the mold first, and because the palm and finger areas of the glove adhere to the mold until they are peeled off, the glove becomes inverted or reversed as it is stripped from the mold such that the external surface of the glove after forming (i.e., the donning side) becomes the internal surface after stripping. However, as described below, the donning side typically requires off-line surface treatment after stripping, so the stripped gloves must be reversed or inverted after stripping to revert the donning side to the exterior surface. Manual and automated inverting processes typically employ suction or bursts of air to assist with fully inverting the glove.

Upon the completion of the on-line dipping process in the dipping platform, the thin film surgical gloves are typically still not finished products. After stripping from the molds, the gloves may undergo several steps of an off-line glove surface treatment process. For example, the gloves may be subjected to an off-line chlorination process, which may involve chlorination, lubrication, and tumble drying prior to inverting the glove such that the donning side becomes the interior surface before the gloves are packaged. These off-line processes often require several pieces of equipment (namely, chemical treatment equipment such as a chlorinator, etc.), an extractor, a tumbling machine, a dryer machine, and/or miscellaneous supporting equipment. Additionally, the off-line equipment is configured to process the gloves in batches, which requires that the formed gloves coming off of the dipping process line be temporarily stored in a queue, which consumes time and physical storage space, to wait for the batch processing equipment to become available. processes are substantial manual operation may also be necessary to operate these pieces of equipment, load and unload the gloves, transfer the gloves and complete these off-line processes prior to packaging the surgical gloves as finished products.

SUMMARY

Certain aspects of the present disclosure are directed toward systems, devices, and methods for stripping a formed thin film elastomeric article from a mold, inverting the article, transferring the article to a mandrel, and securing the inverted article to the mandrel for further on-line processing, thus integrating the dip forming process and the existing off-line surface treatment process into a single, continuous on-line manufacturing process (i.e., on-line dip forming, primary surface treatment, inverting, and secondary surface treatment process). This integration will greatly reduce the dependency on human operators to perform the above-noted tasks, reduce the process cycle time, eliminate the dependency of the off-line equipment/process, lead to space reduction and eliminate miscellaneous equipment handling and maintenance tasks. In certain aspects, the systems, devices, and methods of the present disclosure are suitable for manufacturing elastomeric gloves, such as latex or synthetic polymer medical exam gloves and surgical gloves. It will be appreciated that adaptation of the systems, devices, and methods to provide similar advantages in the manufacture of various other thin film elastomeric articles, such as prophylactics, catheters, balloons, work gloves etc., is well within the capabilities of ordinarily skilled artisans.

In certain aspects, the system can include a stripping apparatus for removing formed gloves from the molds or formers on which they are formed. The stripping apparatus can include a cuff rolling device for rolling the cuff of the glove down (i.e., distally away from the mold base and toward the finger and palm areas of the glove) to expose a portion of the cuff-forming surface of the mold. The stripping apparatus can include a gripping device having one or more gripping members configured to engage the exposed portion of the cuff-forming surface of the mold. The stripping apparatus can include a roll-back device for unrolling the previously rolled portion of the glove cuff proximally toward the mold base and away from the glove finger and palm areas. The roll-back device can be configured to unroll the rolled cuff over and onto a portion of the gripping members such that the gripping members are interposed between the mold surface and at least a portion of the unrolled glove cuff. The stripping apparatus can include a lifting device for lifting the gripping members away from the surface of the mold, thereby separating a portion of the glove cuff area from the mold surface. The stripping apparatus can include an actuation device for moving the gripping members distally away from the mold base to pull or peel the glove away from the mold surface. The actuation device may move the gripping members to a position distal of the finger area to fully remove the glove from the mold, and thereby at least partially invert the glove.

In certain aspects, the system can include a glove donning device configured to receive the glove after it has been stripped from the mold. The system may be configured to move the gripping members of the stripping apparatus over or around a mandrel of the glove donning device to position the glove about one or more holding members of the mandrel, which holding members are configured to expand or separate to engage the interior surface of the inverted glove (i.e., the surface of the glove that was formed adjacent to the mold surface) to securely hold the glove on the mandrel of the glove donning device. The gripping members can be configured to release the gripped portion of the glove when the glove is positioned about the glove donning device. The glove donning device can be coupled to a continuous looped conveyor chain to carry the glove donning device (and the glove disposed thereon) through one or more on-line secondary processes. Accordingly, the system can strip the formed glove from the mold, invert the glove, and position and hold (i.e., mount) the glove on the glove donning device for subsequent on-line processing.

In certain aspects, the system is configured to move continuously and synchronize with the existing continuous dipping line speed to continuously strip, invert, and mount gloves formed by the dip forming process onto glove donning devices for subsequent on-line processing. In certain aspects, the gripping members are coupled to mechanical arms that are guided through translation, expansion, and contraction by one or more cam follower bearings. In certain aspects the glove donning device is expanded and contracted (i.e., opened and closed) by mechanical arms controlled by a cam follower bearing guided by a cam track to move the mechanical arms toward and away from each other.

Certain aspects of the present disclosure are directed toward a method of manufacturing elastomeric articles using the systems and devices of the present disclosure. In certain aspects, the method can include forming an elastomeric glove on the surface of a glove mold, stripping the formed glove from the surface of the mold, inverting the glove, mounting the glove on a glove donning device, and subjecting the glove to one or more secondary processes while the glove is mounted on the glove donning device.

In certain aspects, the method can include rolling down a portion of the cuff of a glove formed on a mold, positioning a gripping member on the exposed portion of the cuff-forming surface of the mold, and unrolling the rolled portion of the glove cuff onto the gripping member such that the gripping member is interposed between the mold surface and at least a portion of the unrolled glove cuff. The method can include lifting the gripping member away from the mold surface to separate a portion of the glove cuff from the mold surface, and moving the gripping member distally away from the mold base and beyond the finger area of the glove, thereby peeling the glove away from the mold surface and at least partially inverting the formed glove.

In certain aspects, the method can include positioning the inverted glove about mandrel of the glove donning device one or more glove holding members of a glove donning device such that the surface of the glove that was formed adjacent to the mold surface becomes the exterior surface of the glove when it is positioned about the glove donning device. The method can include expanding the mandrel to engage the interior surface of the glove, thereby holding the glove securely on the glove donning device. The method can include releasing the gripped portion of the glove when the glove is positioned about the glove donning device such that the glove is fully mounted on the glove donning device. The method can include subjecting the glove to one or more secondary processes while the glove is mounted on the glove donning device.

Any feature, structure, or step disclosed herein can be replaced with or combined with any other feature, structure, or step disclosed herein, or omitted. Further, for purposes of summarizing the disclosure, certain aspects, advantages, and features of the systems, devices, and methods have been described herein. It is to be understood that not necessarily any or all such advantages are achieved in accordance with any particular embodiments disclosed herein. No individual aspects of this disclosure are essential or indispensable.

BRIEF DESCRIPTION OF THE FIGURES

Embodiments of the present disclosure are described by way of following drawings pointing out various details of the systems, devices and methods of the present disclosure. The main features and advantages of the present disclosure will be better understood with the following descriptions, claims, and drawings, where:

FIGS. 9 and 10 illustrate top and side views, respectively, of the transfer system along the transfer path according to certain aspects of the present disclosure.

DETAILED DESCRIPTION

Figure 1:
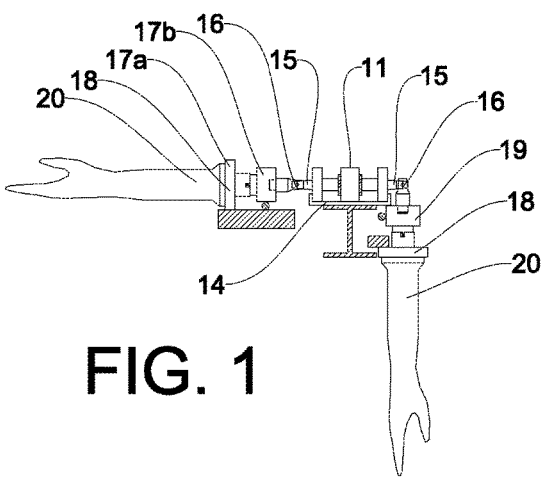
FIG. 1 illustrates a front partial cross-sectional view of elastomeric glove molds and mold holding fixtures coupled to a conveyor chain in a continuous dip forming process loop.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

Various aspects of the systems and devices disclosed herein may be illustrated by describing components that are connected, coupled, attached, bonded and/or joined together. As used herein, the terms "connected", "coupled", "attached", "bonded" and/or "joined" are used interchangeably to indicate either a direct connection between two components or, where appropriate, an indirect connection to one another through intervening or intermediate components. Additionally, unless otherwise specified, these terms are used interchangeably to indicate a connection in which one or more degrees of freedom are not rigidly constrained between two components (e.g., a pivoting connection, a translating connection, a pivoting and translating connection, an elastic connection, a flexible connection, etc.), or a rigid or substantially rigid connection in which all degrees of freedom are constrained or substantially constrained between the two components.

Relative terms such as "lower" or "bottom", "upper" or "top", and "vertical" or "horizontal" may be used herein to describe one element's relationship to another element illustrated in the drawings. It will be understood that relative terms are intended to encompass different orientations of the systems and devices in addition to the orientation depicted in the drawings. By way of example, if aspects of a glove stripping, reversing, donning, and holding system as shown in the drawings are turned over, elements described as being on the "bottom" side of the other element would then be oriented on the "top" side of the other elements as shown in the relevant drawing. The term "bottom" can therefore encompass both an orientation of "bottom" and "top" depending on the particular orientation of the drawing.

Reference will now be made to figures wherein like structures are provided with like reference designations. It should be understood that the figures are diagrammatic and schematic representations of exemplary embodiments of the systems and methods of the present disclosure, and are neither limiting nor necessarily drawn to scale.

Figure 2:
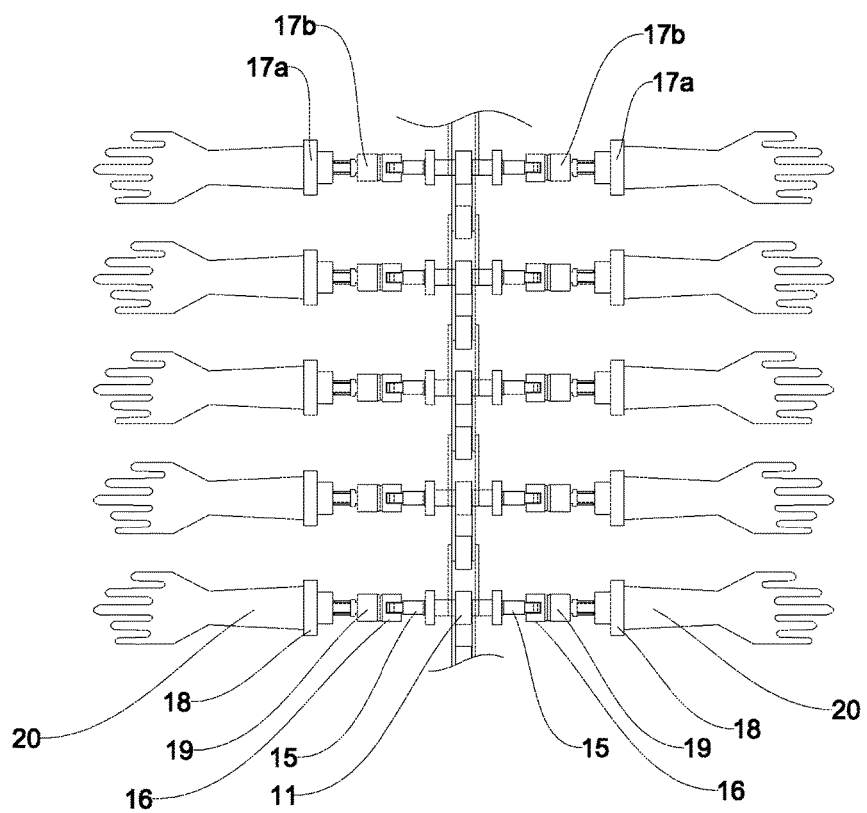
FIG. 2 illustrates a top view of the continuous dip forming process loop of FIG. 1.

One exemplary embodiment of the glove stripping, reversing and wearing system of the present disclosure is implemented in conjunction with a continuous dip forming platform that includes a looped conveyor chain 11, as illustrated in FIGS. 1-2. The conveyor chain 11 is supported by roller bearings that run along a channeled bearing surface 14. One or more drive units, such as an electric motor and appropriate gearing, are coupled to one or more chain sprockets to drive the conveyor chain 11 through the continuous dipping process loop. Opposing pairs of mounting shafts 15 are coupled to the conveyor chain 11 at regular intervals and extend horizontally outwardly from the conveyor chain. A mold holding fixture 18 is coupled to the distal end of each shaft 15. Each mold holding fixture 18 includes a rotatable mold mount 19 for holding the molds 20 such that each mold may be selectively rotated about its longitudinal axis. As shown in FIG. 1, each mounting shaft 15 includes a pivot 16 so that the molds may be oriented horizontally or vertically (i.e., hung down from the mounting shaft), as desired, for example, to facilitate dipping. The mold mount 19 includes one or more bearing surfaces 17a, 17b (which may be rolling, sliding, etc.) and/or rotational guide surfaces, such as a "D" shaped collar (not shown), for guiding and maneuvering the mold 20 through the various processes along the dip forming line.

The conveyor chain 11 typically carries the molds 20 at a constant linear speed throughout the various stages of the dipping process. However, the preferred linear speed may be varied, for example, to adjust dipping or cure times, or otherwise process the gloves differently to accommodate various types of gloves, different forming materials, or varying thicknesses, or to achieve certain physical characteristics, etc. Suitable conveyor chain speeds typically may range from about 40 linear feet per minute to about 60 linear feet per minute.

Figure 3A:
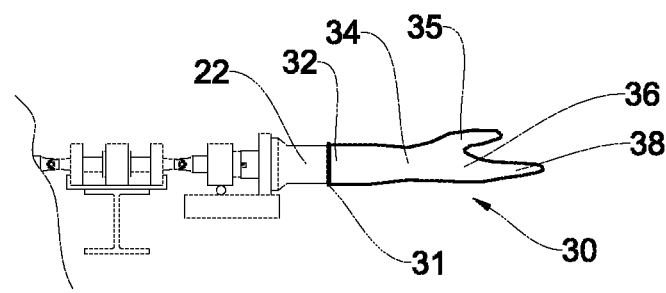
FIGS. 3A-3I illustrate various stages of the transfer process according to certain aspects of the present disclosure.
Figure 3B:
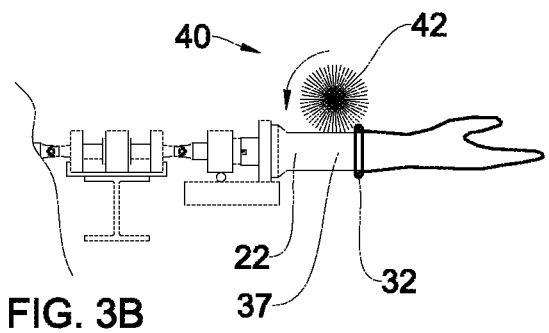

As illustrated in FIG. 3A, a thin film elastomeric glove 30 includes a cuff area 32, a wrist area 34, a thumb area 35, a palm area 36, and a finger area 38. Prior to the beginning of the glove stripping, reversing, and wearing process (which is also referred to as the transfer process) described in detail below, the glove 30 has been formed on the surface 22 of the mold 20 (which is also referred to as a former) by a suitable forming process, such as a continuous dipping line process, and the glove rests on the mold surface 22. The glove 30 may also have been subjected to one or more post-forming processes along the continuous dipping line. It should be understood that any process may be used to coat or treat the external layer of the thin film to form the donning layer, such as dipping, spraying, immersion, vapor deposition, printing, or any other suitable technique. Alternatively, the donning layer can be formed off-line by similar techniques apparent to those of ordinary skill in the art.

The following description is intended to provide an overview of the transfer process, however, one exemplary embodiment of the transfer process will be described with greater detail in conjunction with the below description of the exemplary embodiments of the systems and devices provided to accomplish the transfer process. Referring to FIGS. 3-4, the transfer process generally involves gripping the cuff portion of the glove and pulling or peeling the glove away from the mold surface by pulling the cuff portion toward, and then distally of, the finger area. Adhesion of the glove to the mold surface causes the glove to invert (i.e., turn inside-out) as the glove is peeled from the mold. The gripped cuff area is pulled over a cantilevered end of a donning device mandrel positioned distally of the mold such that the inverted glove surrounds a portion of the mandrel (i.e., the donning device mandrel "wears" the glove). When the glove has been fully released from the mold surface and is positioned about the mandrel, the device expands or separates to engage the interior surface of the inverted glove and securely hold the glove in place on the donning device mandrel. The gripped cuff area is then forced away from the grippers by an external force (such as a burst of air or jet of water) or otherwise released from the grippers so that the inverted glove is fully held or worn on the donning device mandrel. The donning device is coupled to a second conveyor chain that carries the glove through secondary processes as it is securely held on the donning device.

Figure 6:
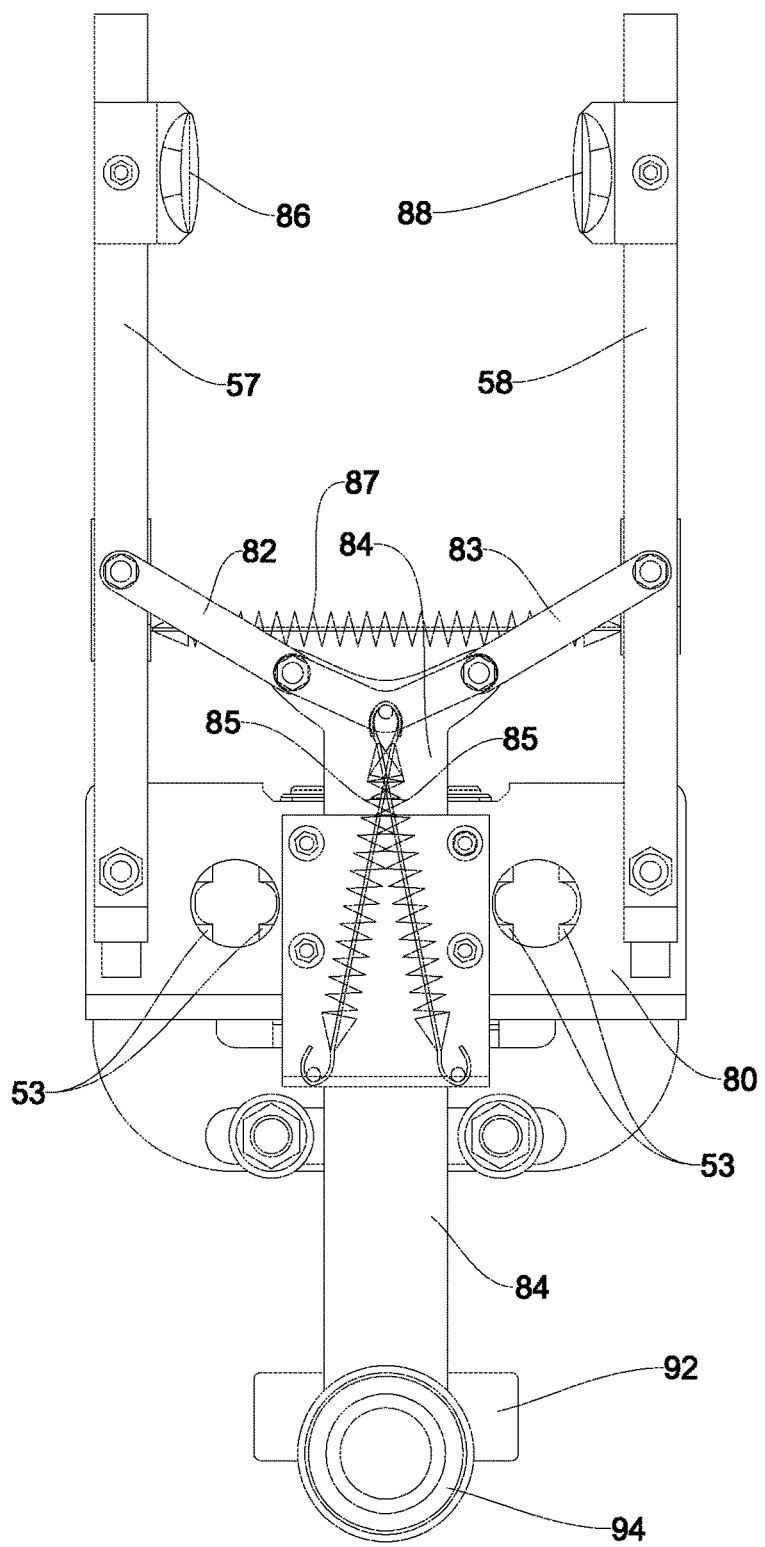
FIG. 6 illustrates a front view of a glove stripping device according to certain aspects of the present disclosure.
Figure 7:
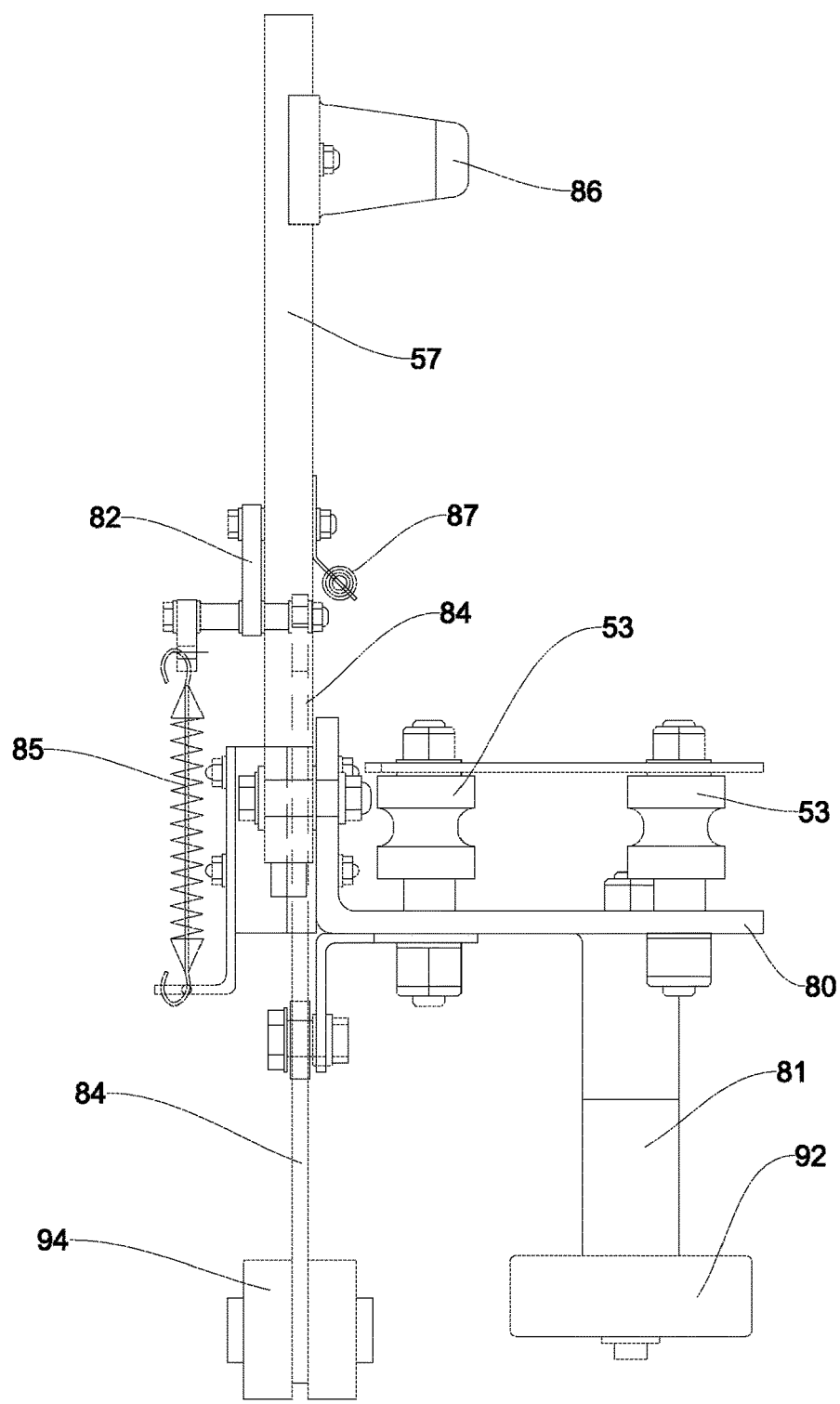
FIG. 7 illustrates a side view of the glove stripping device of FIG. 6.

FIG. 143 illustrate exemplary embodiments of the various devices that may be implemented to accomplish the transfer process described above. These devices include a cuff rolldown device 40 as illustrated in FIG. 4, a gripping, lifting, and pulling apparatus (i.e., a glove stripping device 40), as illustrated in FIGS. 6-7, and a glove receiving and holding device (i.e., a glove donning device 100), as illustrated in FIG. 11.

To initiate the transfer process, the cuff edge 31, which is typically beaded, is rolled down toward the wrist area 34 by a cuff roll down device 40, such as the one illustrated in FIG. 4. In this embodiment, the cuff roll-down device 40 includes a cylindrical brush 42 coupled to a rotary shaft 43, which is supported at opposite ends by rotary bearings 44a, 44b. A drive shaft 46 of an electric motor 47 is coupled to the rotary shaft 43 by a drive belt 49 to rotate the brush 42. The motor 47 drives the cylindrical brush 42 to rotate about an axis parallel to the direction of travel of the conveyor chain 11. As each mold 30 traverses down the length of the brush 42, it is rotated about its longitudinal axis such that each portion of the glove cuff edge 31 engages with the brush bristles 41, which cause the cuff edge 42 to roll down toward the wrist area 34 of the glove 30. As the cuff area 32 is rolled down, a portion 37 of the cuff area of the mold surface 22 is exposed. Although a cylindrical brush is illustrated in this embodiment, it will be appreciated by ordinarily skilled artisans that the cuff area 32 may be rolled, folded, lifted, or otherwise forced away from the mold surface by any suitable mechanism, such as by forced air or water, or by a solid or foam surface roller. In certain embodiments, separate cuff rolling devices may be configured to roll the cuff down while the cuff rolling devices move along a separate continuous loop (in a similar manner as described below with respect to the glove stripping devices), to synchronize with the motion of the glove molds as the device rolls down the cuff edge.

After the cuff edge 31 is rolled down, the mold 20 and glove 30 enter a transfer path 14 of the transfer system 10, as shown in FIG. 4. As illustrated in FIG. 4, the transfer system 10 includes a plurality of glove stripping devices 50 each of which is slidably coupled to a pair of linear guide rails 52 that are connected at opposite ends to a pair of transfer system conveyor chains 51a, 51b. Additionally, an actuation device 140 is coupled to each pair of linear guide rails 52 and serves to compress the glove donning device mandrel arms 72, 73 prior to receiving the inverted glove 30. The transfer system conveyor chains 51a, 51b are synchronized with gears and/or sprockets 55 and chains 56 to move the glove stripping devices 50 along the transfer path 14 in synchronization with the molds 20 travelling along a portion of the main dipping line path 64. After the glove stripping devices 50 have passed through the transfer path 14, the transfer system conveyor chains 51a, 51b carry them along a return path 62 and back to the beginning of the transfer path 14.

Upon entering the transfer path 14, the glove mold 20 is lowered between a pair of opposing mechanical arms 57, 58 of the glove stripping device 50, as illustrated in FIG. 4. The glove stripping device 50 includes a carriage body 80 to which the lower ends of the mechanical arms 57, 58 are pivotably coupled. Links 82, 83 are pivotably coupled to central portions of the arms 57, 58, and to an upper end of a push rod 84. The push rod 84 is slidably coupled to the carriage body 80 such that the push rod 84 may translate vertically up and down. As the push rod is raised from a lower to an upper position, the links 82, 83 pivot and push the mechanical arms away from each other to an open state as shown in FIG. 6. Tension springs 85 are coupled to the push rod 84 and the carriage body 80 so as to bias the push rod 84 downward. An additional tension spring 87 is coupled to central portions of the mechanical arms 57, 58 so as to bias the arms toward each other (i.e., toward a closed position) to form a better grip with the bare mold and to accommodate different sizes of molds (such as different molds that are used to used to form different sized gloves).

The carriage body 80 of the glove stripping device 50 is slidably mounted to a pair of the linear guide rails 52 via linear guide rail bearings 53. A horizontal cam follower bearing 92 is coupled to a rod 81 extending below the carriage body 80 The horizontal cam follower bearing 92 is configured to roll along a horizontal cam track 93 extending along the transfer path 14. The horizontal cam track 93 is profiled, as illustrated in FIG. 9, to cause the glove stripping device 50 to translate along the linear guide rails 52 from a position proximal to the glove mold base 21 to a position distal of the glove mold finger area 38 during the transfer process. The glove stripping device 50 also includes a vertical cam follower bearing 94 coupled to a lower end of the push rod 84. During the transfer process, the vertical cam follower bearing 94 rolls along a vertical cam track 95 extending along the transfer path 14. As illustrated in FIG. 10, the cam track 95 is profiled to raise and lower the cam follower bearing 94 and the push rod 84 thus opening and closing the mechanical arms 57, 58 as the glove stripping device 50 travels along the transfer path 14.

Figure 8A:
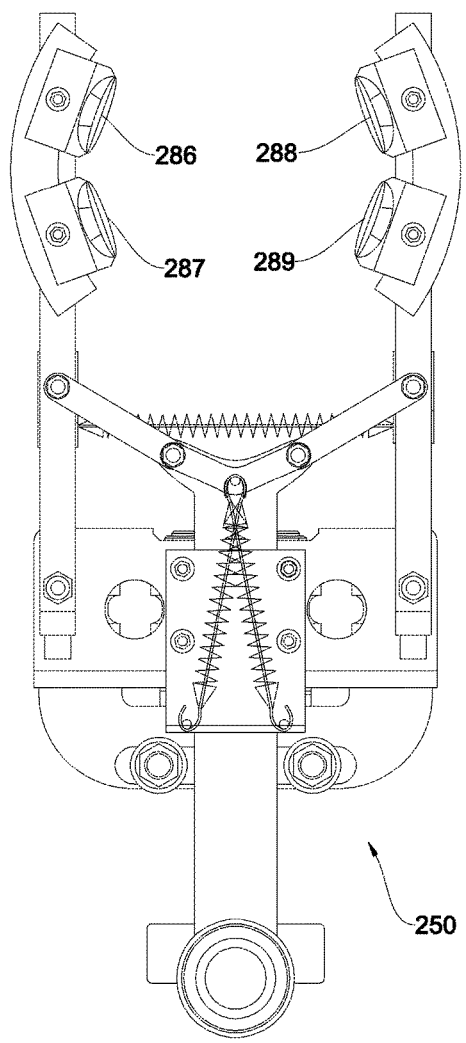
FIGS. 8A and 8B illustrate front and side views, respectively, of a glove stripping device according to certain other aspects of the present disclosure.
Figure 8B:
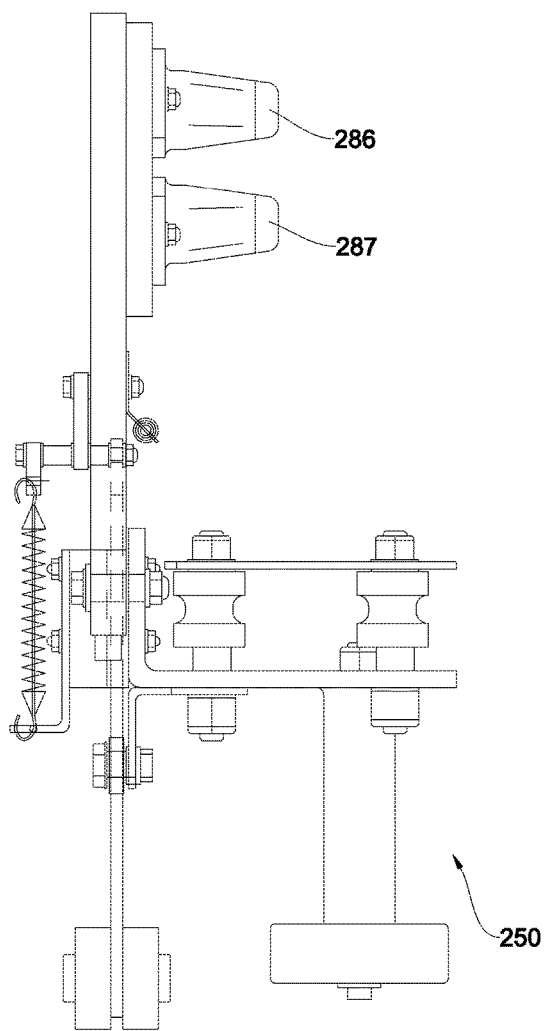

Before the glove mold 20 is lowered between the mechanical arms 57, 58, the vertical cam track profile causes the push rod 84 to rise upward, which increases tension in the springs 85, 87, and causes the mechanical arms 57, 58 to move to an open position as shown in FIG. 10. After the glove mold is positioned between the mechanical arms 57, 58 at the beginning of the transfer path 14, the vertical cam track profile is lowered, thus allowing the springs 85, 87 to pull the mechanical arms 57, 58 together until the gripping members 86, 88 rest on the portion of the mold surface that was exposed when the cuff edge 31 was rolled down (i.e., the surface of the mold where the rolled cuff portion of the glove originally rested). Although FIGS. 6-7 illustrate one gripping member coupled to each of the mechanical arms ordinarily skilled artisans will appreciate that any number of gripping members may be used in any suitable configuration to facilitate gripping, lifting, and removal of the glove from the mold surface. For example, FIGS. 8A-B. illustrate an embodiment that includes two gripping members coupled to each arm 57, 58. Similarly, although the glove stripping device 50 of the present embodiment is illustrated with two mechanical arms, it will be appreciated that any number of arms may be used in any suitable configuration. The gripping members may be formed of any suitable material known in the art. In an exemplary embodiment, the grippers may be formed of a rubber or plastic material to conform to the surface of the mold and to more easily grip the material of the glove. Ridges or other suitable contours may be formed on the glove engaging surface of the gripping members to assist in preventing the glove from slipping off of the gripping members.

Figure 3C:
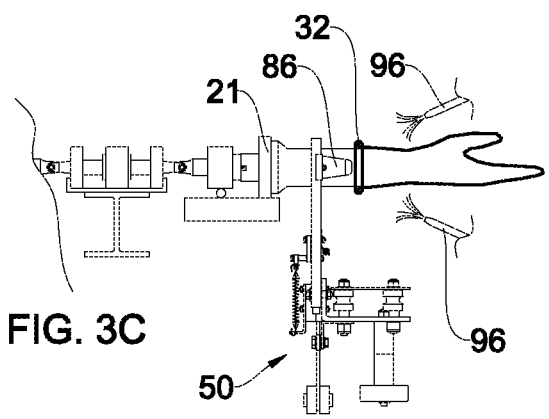
Figure 3D:
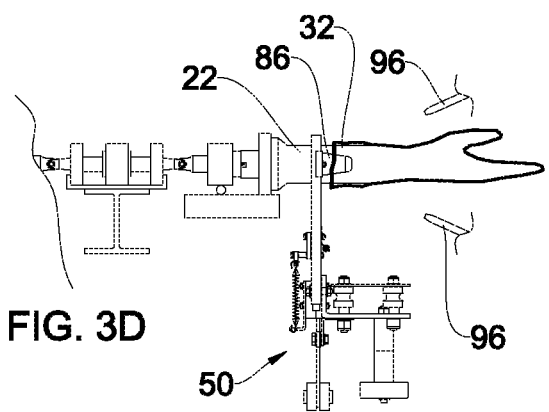
Figure 4:
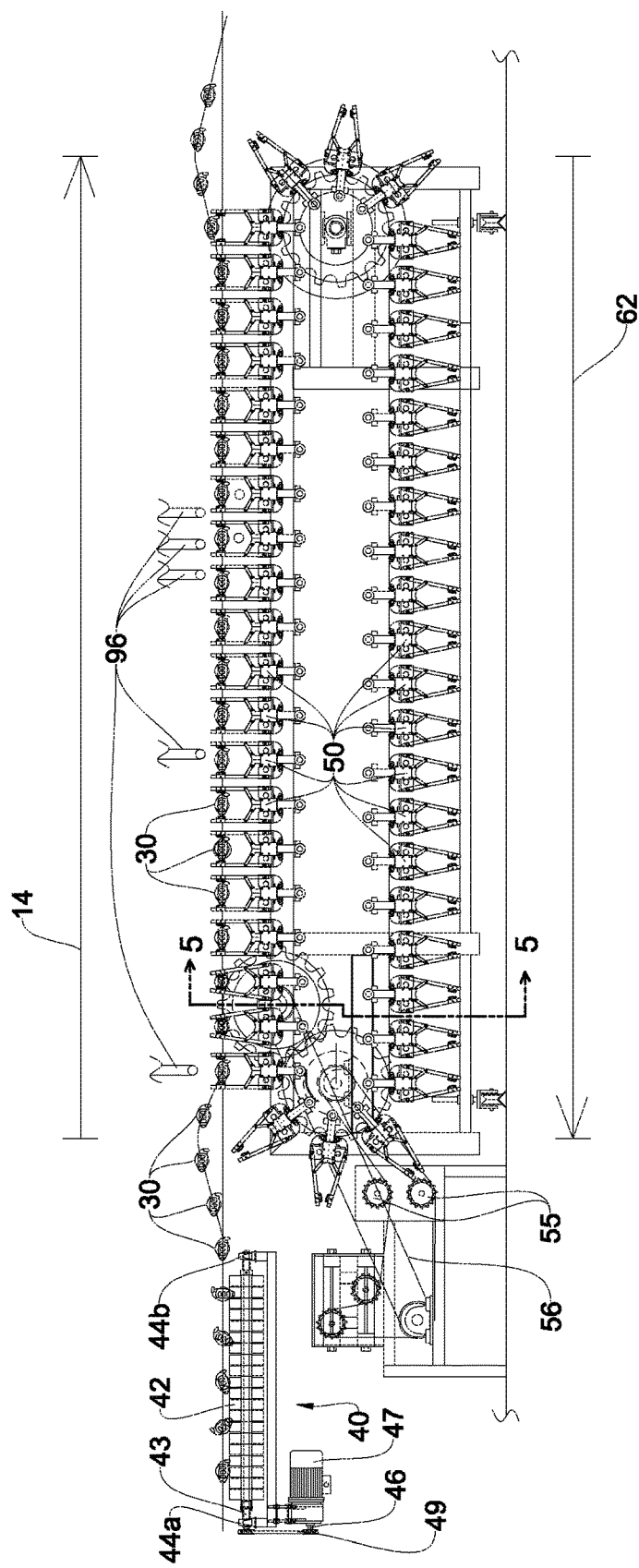
FIG. 4 illustrates a side view of the transfer system according to certain aspects of the present disclosure.
Figure 5:
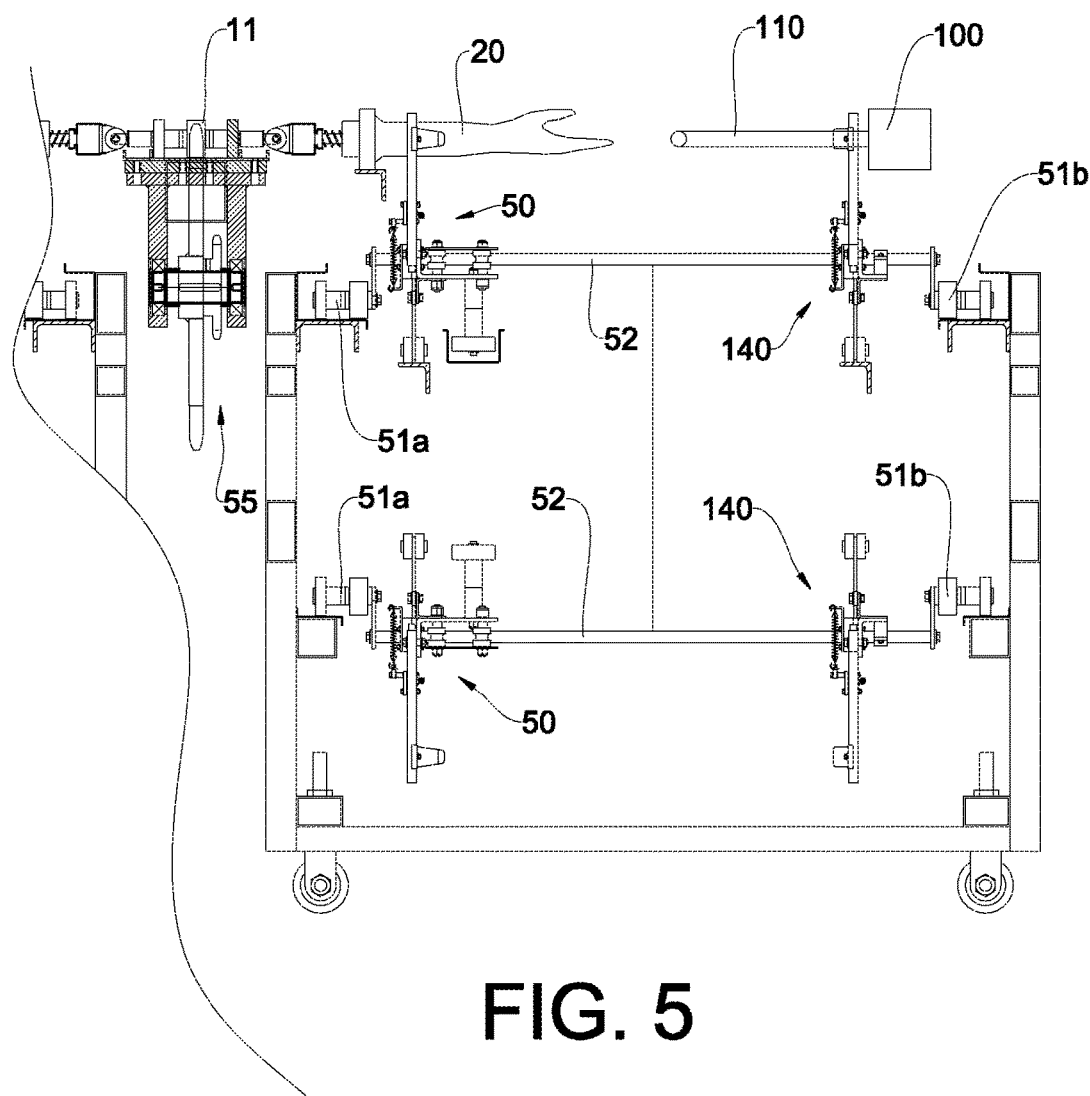
FIG. 5 illustrates a front partial cross-sectional view of the transfer system of FIG. 4.

When the gripping members 86, 88 are positioned against the mold 20, as shown in FIG. 3C, the rolled portion 32 of the thin film glove is unrolled, pushed or otherwise urged back proximally toward the mold base 21 by a force (for example, by means of one or more pressurized air nozzles 96 or water jets). The force used to unroll the rolled cuff portion 32 causes the cuff 32 to lay over the gripping members 86, 88 such that at least a portion of the gripping members 86, 88 is interposed between the unrolled cuff portion 32 and the mold surface 22, as illustrated in FIG. 3D.

The air nozzles 96 or water jets may be mounted on stationary equipment above and/or below the transfer path 14 in suitable proximity and orientation to direct a burst of air or jet of water toward the rolled cuff edge 31 as it passes by. The air nozzles or water jets may be connected by tubing or hoses to a source, for example an air compressor and reservoir tank positioned near the transfer system or a central pressurized air supply line system. Air or water may be continuously dispensed, or more preferably is controlled by mechanical or solenoid valves or other suitable fluid control devices to deliver intermittent bursts sufficient to roll back the cuffs. The timing of the bursts may be synchronized or controlled by various known devices and methods. For example, timing may be controlled with the aid of electronic sensors (such as optical, magnetic, or sonic sensors), or by a mechanical switch that is triggered by mechanical contact with a portion of each passing mold (or other moving equipment associated with each glove). In certain embodiments, a brush or solid surface cylindrical roller may also be used in lieu of, or in addition to, an air nozzle, water jet, etc.

Figure 3E:
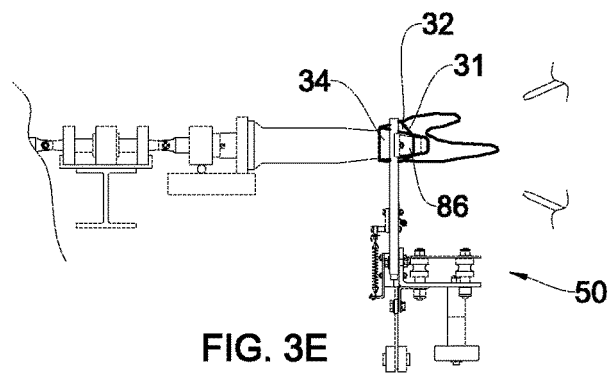

After the cuff 32 has been rolled back and is laying over the gripping members 86, 88, the gripping members are moved to an open position (by raising the push rod 84 via the vertical cam track profile 95) to expand (i.e., separate) the gripping members 86, 88 and thereby lift the glove cuff area 32 away from the mold surface 22. After the gripping members 86, 88 are lifted from the mold surface 22, the horizontal cam track 93 causes the glove stripping device 50 (and thus the gripping members 86, 88) to translate distally toward the finger area 38 of the glove 30, thereby pulling or peeling the glove off of, and away from, the mold surface 22 as illustrated in FIG. 3E.

One or more bursts of air or water jets may be directed at the glove to help urge the glove film away from the mold surface. In the exemplary embodiment illustrated in FIG. 3F, a burst of air is directed into a pocket 97 formed generally between the portion 99 of the glove that has been peeled off of the mold 20 and the portion of the glove that remains on the mold surface 22. The temporarily increased air pressure inside the pocket 97 causes the peeled off portion 99 to balloon radially outward from the mold surface 22, thus momentarily increasing the radially outward component of tensile force acting at the peel seam 9 to help release the thumb area 35 and palm area 36 from the mold surface 22.

Figure 3F:
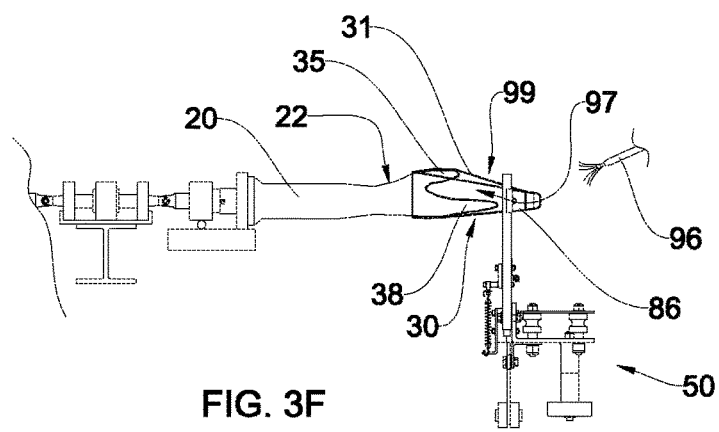
Figure 3G:
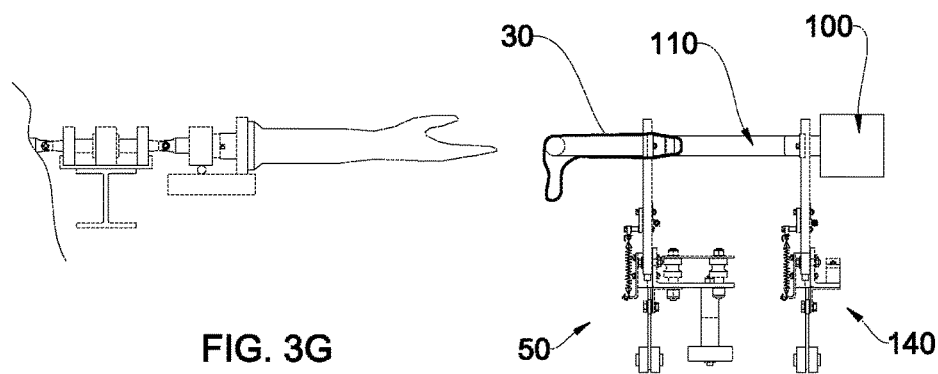
Figure 3H:
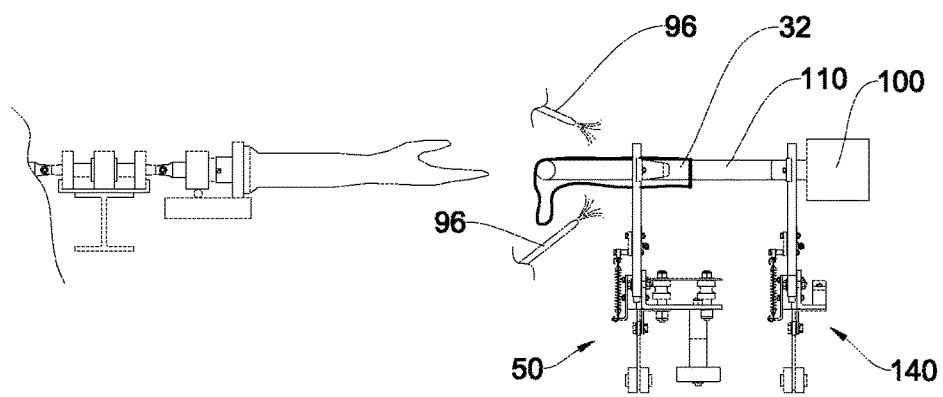
Figure 3I:
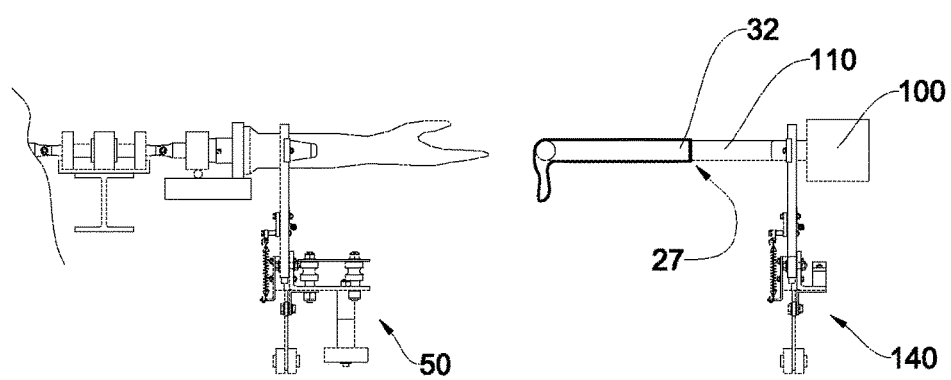

As the gripping members 86, 88 move distally beyond the finger area 38 of the mold 20 (as illustrated in FIG. 3F), the distal portions of the glove 30 initially remain adhered to the mold surface 22, thus causing the glove to become inverted as the cuff edge 31 is pulled distally of the finger area 38. The gripping members 86, 88 pull the glove 30 onto a mandrel 110 of the glove donning device 100, as shown in FIG. 3G. When the gripping members 86, 88 reach a predetermined position, the glove donning device 100 expands or separates portions of the mandrel 110 to tension to the glove to hold it firmly on the mandrel 110. The glove cuff 32 is then released from the gripping members 86, 88, for example, by a burst of air directed into the pocket 109 generally formed between the gripped portion 39 of the glove cuff 32 and the exterior surface of the portion of the glove held by the mandrel 110, such that the inverted glove 30 is fully mounted on the glove donning device 100. Optionally, another burst of air may be directed into the interior of the inverted glove (e.g., through the cuff opening 27 between the mandrel arms 57, 58, or through a channel routed through the interior of the mandrel arms to an exit port positioned at a distal portion of the mandrel arms) to temporarily inflate the inverted glove to ensure that it is fully inverted when mounted on the glove donning device.

Figure 11A:
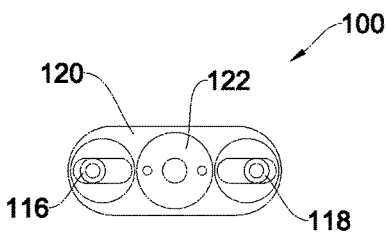
FIGS. 11A-11D illustrate a glove donning device in expanded and retracted states according to certain aspects of the present disclosure.
Figure 11C:
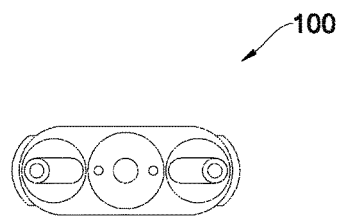
Figure 11B:
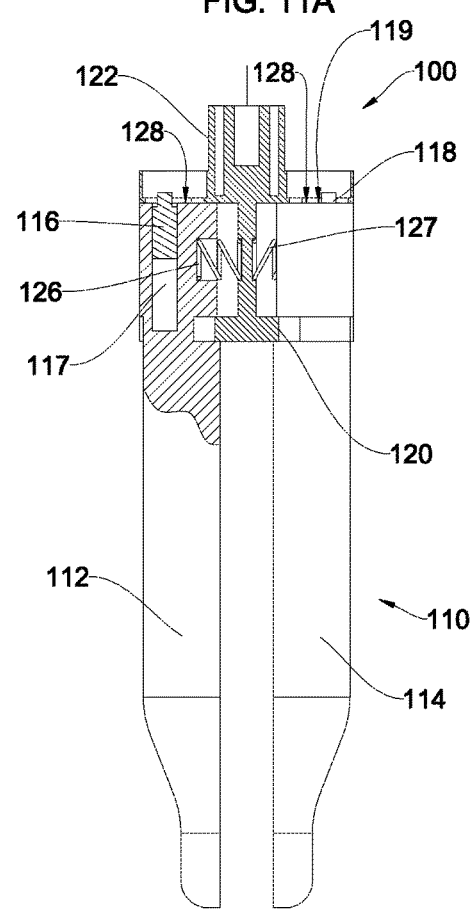
Figure 11D:
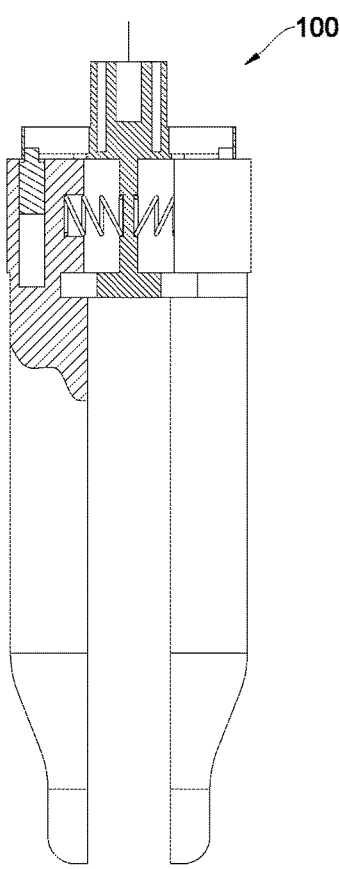

The glove donning device 100 of this exemplary embodiment includes a base 120 having a mounting portion 122 at a proximal end, and a mandrel portion 110 comprising two mandrel arms 112, 114 extending distally from the base 120 along a longitudinal axis of the glove donning device 100, as illustrated in FIGS. 11A-D. The mandrel arms 112, 114 are slidably coupled to the base 120 such that the arms can move toward and away from each other in a horizontal plane. In other words, the mandrel portion 110 can expand and retract in a horizontal direction transverse to the longitudinal axis of the mandrel 100 by sliding the mandrel arms 112, 114 away from each other and toward each other, respectively. The mandrel arms 112, 114 are retained in the base by retention pins 116, 118 inserted into bores 117, 119 in the proximal surfaces 121, 123 of the arms 112, 114. The retention pin heads 116, 118 are slidably disposed in pin slots 124, 125 provided at the proximal end of the base 120. Springs 126, 127 are disposed between opposing interior-facing surfaces 128, 129 of the mandrel arms 112, 114 and opposite sides of an interior central wall 115 of the base 120. The springs 126, 127 are normally compressed to bias the mandrel arms 112, 114 toward a fully expanded state, as shown in FIGS. 11C-D. The glove donning device 100 is coupled via a holding device 113 (e.g., a device similar to the mold holders) to a secondary conveyor chain, which carries it (and other glove donning devices 100) and the inverted glove 30 received thereon through one or more on-line secondary processes.

Near the beginning of the transfer path, the glove donning device 100 (in the expanded state) is lowered between a pair of mechanical actuation arms 142, 144 of an actuation device 140. The actuation arms 142, 144 are pulled toward each other to push or compress the mandrel arms 112, 114 toward each other to a retracted state. When the actuation arms 142, 144 are separated, the springs 126, 127 of the glove donning device 100 force the mandrel arms 112, 114 away from each other, thus returning the mandrel arms to the expanded state. Similar to the glove stripping device 50, the actuation device 140 includes a carriage body 180 to which the lower ends of the actuation arms 142, 144 are pivotably coupled. Links 182, 183 are pivotally coupled to central portions of the arms 142, 144 and to an upper end of a push rod 184. The push rod 184 is slidably coupled to the carriage body 180 such that the push rod 184 may translate vertically up and down. As the push rod 184 is lowered from a raised or closed state, the links 182, 183 pivot and pull the mechanical arms toward each other to a closed position as shown in FIG. 10. The actuation device 140 also includes a vertical cam follower bearing 194 coupled to a lower end of the push rod 184. During the transfer process, the vertical cam follower bearing 194 rolls along a cam track 195 extending along the transfer path 14. As illustrated in FIG. 10, the cam track 195 is profiled so as to raise and lower the cam follower bearing 194 and the push rod 184, and therefore open and close the actuation arms 142, 144, as the actuation device travels along the transfer path 14.

Figure 12:
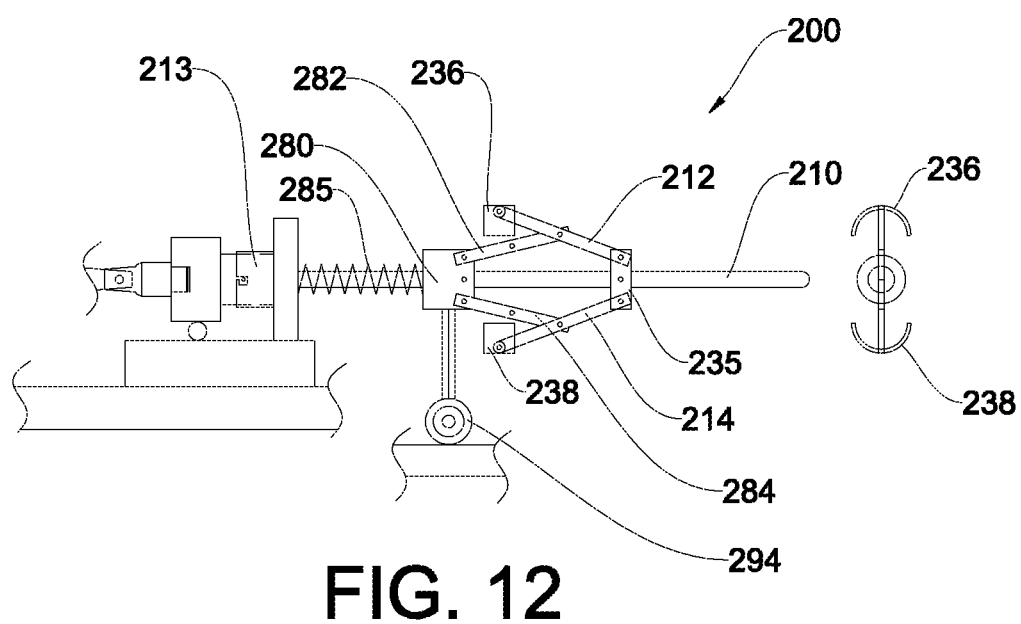
FIGS. 12-15 illustrate various glove donning devices according to certain other aspects of the present disclosure.

It will be appreciated that the principles and concepts of the present disclosure that are embodied in the foregoing examples may also be implemented in various structural and functional equivalent embodiments, some examples of which are described as follows. An alternative embodiment of the glove donning device is illustrated in FIG. 12. In this embodiment, the glove donning device 200 includes a mandrel shaft 210 extending from the holding device 213 to a distal end 219, a shaft collar 235 is rigidly coupled to a middle portion of the mandrel shaft. Mechanical arms 212, 214 are pivotably coupled at one end to the shaft collar 235 and at another end to arcuate cowl segments 236, 237. Links 282, 284 are pivotably coupled to middle portions of the arms 212, 214 and to a carriage 280 slidably coupled to the shaft 210 proximally of the shaft collar 235. As the carriage 280 is translated along the shaft 210 toward the shaft collar 235, the links 282, 284 pivot and push the mechanical arms 212, 214, 216 radially outward from the shaft to an expanded position wherein the cowl segments 236, 237 may engage the interior surface of an inverted glove. Conversely, as the carriage 280 is moved proximally, the mechanical arms retract radially inward toward the shaft 210 to a retracted position. A coil spring 285, retained about the shaft 210 between the carriage 280 and the holding device 213, is normally compressed so as to urge the carriage 280 distally to the expanded position. A cam follower bearing 294 and cam surface (not shown) serve to control movement of the carriage and thus the mechanical arms between expanded and retracted positions.

Figure 13:
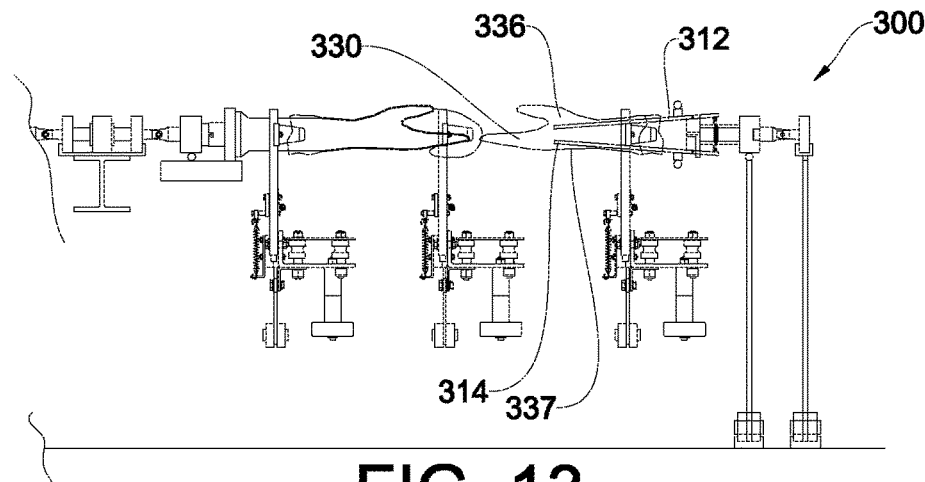
Figure 14:
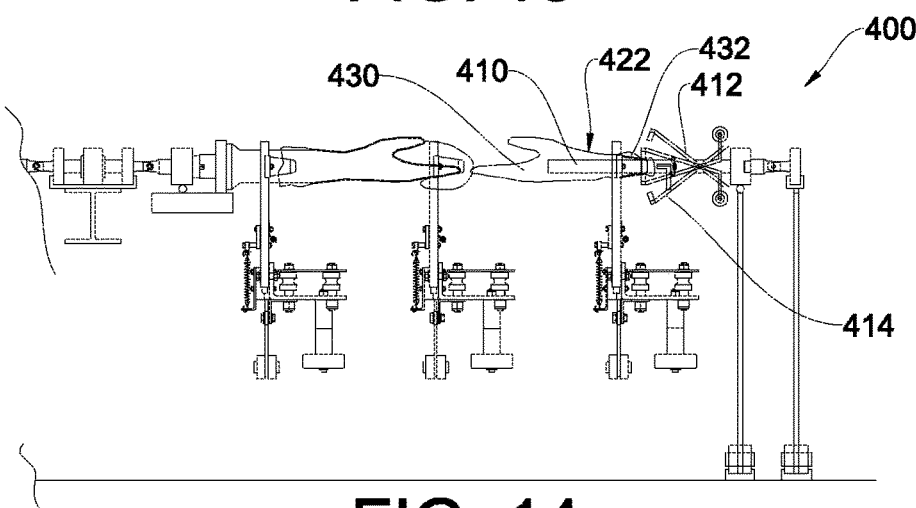

In certain embodiments, as illustrated in FIG. 13, the glove donning device 300 includes mechanical plates 312, 314 rather than mandrel arms. The mechanical plates 312, 314 are generally oriented along horizontal planes, and are controlled by a cam follower bearing 394 and cam surface profile (not shown) to expand away from each other in a vertical direction to engage the palm 336 and back of hand 337 portions of the inverted glove 330. In certain other embodiments, as illustrated in FIG. 14, the glove donning device 400 includes a mandrel member 410 about which the glove 430 is positioned, and includes a scissor-type arrangement of pincher arms 412, 414 that may be controlled to engage opposing portions of the exterior surface 422 of the cuff area 432 of the inverted glove 430 to firmly hold the glove between the pincher arms 412, 414 and the mandrel 410.

Figure 15:
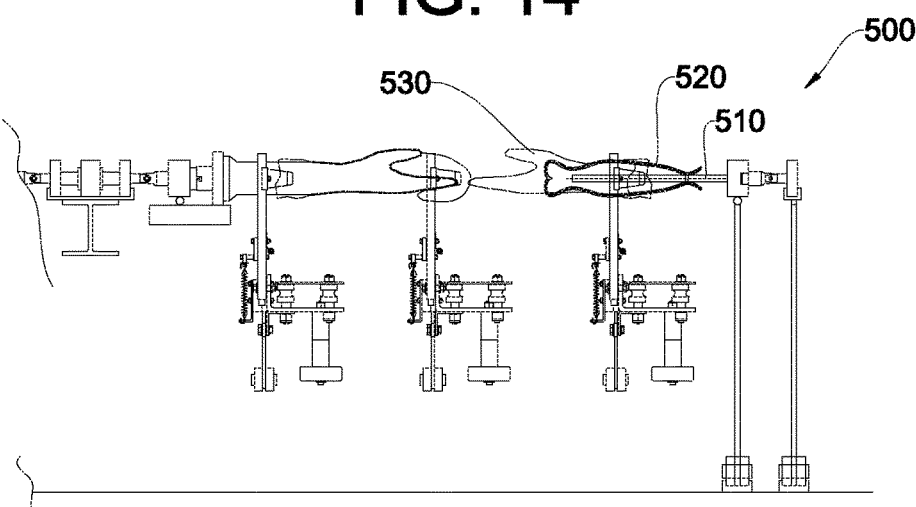

In certain other embodiments, As shown in FIG. 15, the glove donning device 500 includes an inflatable bladder 520 coupled to a mandrel shaft 510. Air, water, or other suitable fluid may be supplied to the interior of the bladder through a lumen in the mandrel shaft 510 to inflate and expand the bladder to engage the interior surface of an inverted glove 530 positioned about the bladder 520. The bladder 520 may be constructed of any suitable material that is flexible, durable, and gas or fluid impervious, such as a flexible polymer, vulcanized rubber, etc.

The foregoing description is provided to enable any person skilled in the art to practice the various example implementations described herein. Various modifications to these variations will be readily apparent to those skilled in the art, and the generic principles defined herein may be applied to other implementations. All structural and functional equivalents to the elements of the various illustrious examples described throughout this disclosure that are known or later come to be known to those of ordinary skill in the art are expressly incorporated herein by reference.

The invention claimed is:

1. A system comprising an online glove stripping and inverting mechanism for stripping and inverting an elastomeric article from a mold and re-donning the glove on a second mechanism for secondary online processing;
   wherein the glove stripping and inverting mechanism comprises a stripping apparatus that comprises a cuff rolling device and a roll-back device; and
   wherein the second mechanism comprises a glove donning device; and
   wherein the glove donning device comprises at least one mandrel.

2. The system of claim 1, wherein the mold is a former.

3. The system of claim 1, wherein the glove stripping and inverting mechanism comprises a glove stripping device.

4. The system of claim 3, wherein the glove stripping device comprises at least one mechanical arm.

5. The system of claim 4, wherein the glove stripping device comprises at least two mechanical arms.

6. The system of claim 3, wherein the glove stripping device comprises one or more gripping members.

7. The system of claim 1, wherein the stripping apparatus comprises a lifting device.

8. The system of claim 1, wherein the stripping apparatus comprises an actuation device.

9. The system of claim 1, wherein the mandrel has at least one holding member.

10. The system of claim 1, wherein the roll-back device of the system further comprises air nozzles.

11. A system comprising an online glove stripping and inverting mechanism for stripping and inverting an elastomeric article from a mold and re-donning the glove on a second mechanism for secondary online processing;
    wherein the glove stripping and inverting mechanism comprises a stripping apparatus that comprises a cuff rolling device and a roll-back device.

12. The system of claim 1, wherein the second mechanism comprises a glove donning device.

13. The system of claim 12, wherein the glove donning device comprises at least one mandrel.

14. The system of claim 11, wherein the mold is a former.

15. The system of claim 11, wherein the glove stripping and inverting mechanism comprises a glove stripping device.

16. The system of claim 15, wherein the glove stripping device comprises at least one mechanical arm.

17. The system of claim 16, wherein the glove stripping device comprises at least two mechanical arms.

18. The system of claim 15, wherein the glove stripping device comprises one or more gripping members.

19. The system of claim 11, wherein the stripping apparatus comprises a lifting device.

20. The system of claim 11, wherein the stripping apparatus comprises an actuation device.

21. The system of claim 11, wherein the mandrel has at least one holding member.

22. The system of claim 11, wherein the roll-back device of the system further comprises air nozzles.

* * * * *